United States Patent
Pine et al.

(10) Patent No.: US 8,170,322 B2
(45) Date of Patent: May 1, 2012

(54) OPTICAL IMAGING SYSTEM AND METHOD USING A REFLECTIVE BACKGROUND

(75) Inventors: Jeffrey Augustus Pine, Union Springs, NY (US); Wei Lee, Manlius, NY (US)

(73) Assignee: JADAK LLC, North Syracuse, NY (US)

( * ) Notice: Subject to any disclaimer, the term of this patent is extended or adjusted under 35 U.S.C. 154(b) by 977 days.

(21) Appl. No.: 11/277,183

(22) Filed: Mar. 22, 2006

(65) Prior Publication Data

US 2007/0286495 A1 Dec. 13, 2007

(51) Int. Cl.
*G06K 9/00* (2006.01)

(52) U.S. Cl. ......... 382/141; 382/100; 382/181; 348/370

(58) Field of Classification Search .................. 382/100, 382/141, 142, 181, 183; 705/26; 235/380
See application file for complete search history.

(56) References Cited

U.S. PATENT DOCUMENTS

| | | | |
|---|---|---|---|
| 3,198,097 A * | 8/1965 | Hine ............................ 396/182 |
| 4,084,742 A * | 4/1978 | Silverman ..................... 235/383 |
| 4,205,917 A * | 6/1980 | Abramson ..................... 356/458 |
| 4,236,781 A | 12/1980 | Arimura |
| 4,629,319 A * | 12/1986 | Clarke et al. ............... 356/237.2 |
| 4,859,862 A * | 8/1989 | Planke et al. ............. 250/559.05 |
| 4,891,529 A * | 1/1990 | Braun et al. ............. 250/559.19 |
| 4,972,093 A | 11/1990 | Cochran |
| 5,072,127 A | 12/1991 | Cochran |
| 5,233,186 A * | 8/1993 | Ringlien ..................... 250/223 B |
| 5,393,965 A * | 2/1995 | Bravman et al. ............... 235/383 |
| 5,442,446 A * | 8/1995 | Gerber et al. ................. 356/428 |
| 5,491,328 A * | 2/1996 | Rando ....................... 235/462.14 |
| 5,528,371 A | 6/1996 | Sato et al. |
| 5,540,301 A * | 7/1996 | Dumont .......................... 186/61 |
| 5,825,495 A | 10/1998 | Huber |
| 5,828,056 A | 10/1998 | Alderman et al. |
| 5,898,169 A * | 4/1999 | Nordbryhn ................ 250/223 B |
| 5,943,125 A | 8/1999 | King |
| 5,946,500 A * | 8/1999 | Oles ................................... 396/3 |
| 6,075,883 A | 6/2000 | Stern et al. |
| 6,122,048 A | 9/2000 | Cochran et al. |
| 6,290,382 B1 | 9/2001 | Bourn et al. |
| 6,363,366 B1 * | 3/2002 | Henty ........................... 705/400 |
| 6,488,390 B1 | 12/2002 | Lebens et al. |
| 6,588,669 B1 * | 7/2003 | Claus et al. ................. 235/462.4 |
| 6,643,009 B2 | 11/2003 | Takakusaki et al. |
| 6,667,762 B1 | 12/2003 | Bouvier et al. |
| 6,784,447 B2 | 8/2004 | Gochar, Jr. |
| 6,885,767 B1 * | 4/2005 | Howell ......................... 382/173 |
| 7,319,805 B2 * | 1/2008 | Remillard et al. ............ 385/147 |
| 2003/0112430 A1 | 6/2003 | Lindner |
| 2004/0095465 A1 | 5/2004 | Numazaki et al. |
| 2004/0136190 A1 | 7/2004 | Christoph |

(Continued)

*Primary Examiner* — Matthew Bella
*Assistant Examiner* — Eric Rush
(74) *Attorney, Agent, or Firm* — David L. Nocilly; Bond Schoeneck & King

(57) ABSTRACT

A system for obtaining an image of an object using an optical imager having an illumination source that is positioned on one side of the object to be imaged and a reflective background positioned on the other side of the object. The imaging system may be implemented in an assembly line or sample processor by using at least one imager and a reflective background positioned behind the samples moving along the assembly or process line. The imager is programmed to decode barcode information and to identify objects in the image using pattern matching techniques.

18 Claims, 7 Drawing Sheets

U.S. PATENT DOCUMENTS

| | | |
|---|---|---|
| 2004/0150815 A1 | 8/2004 | Sones et al. |
| 2004/0184032 A1 | 9/2004 | Mahon et al. |
| 2004/0190132 A1 | 9/2004 | Laschke et al. |
| 2004/0245332 A1* | 12/2004 | Silverbrook et al. .......... 235/380 |
| 2005/0098633 A1* | 5/2005 | Poloniewicz et al. ..... 235/462.14 |
| 2006/0067572 A1* | 3/2006 | White et al. ................... 382/152 |

* cited by examiner

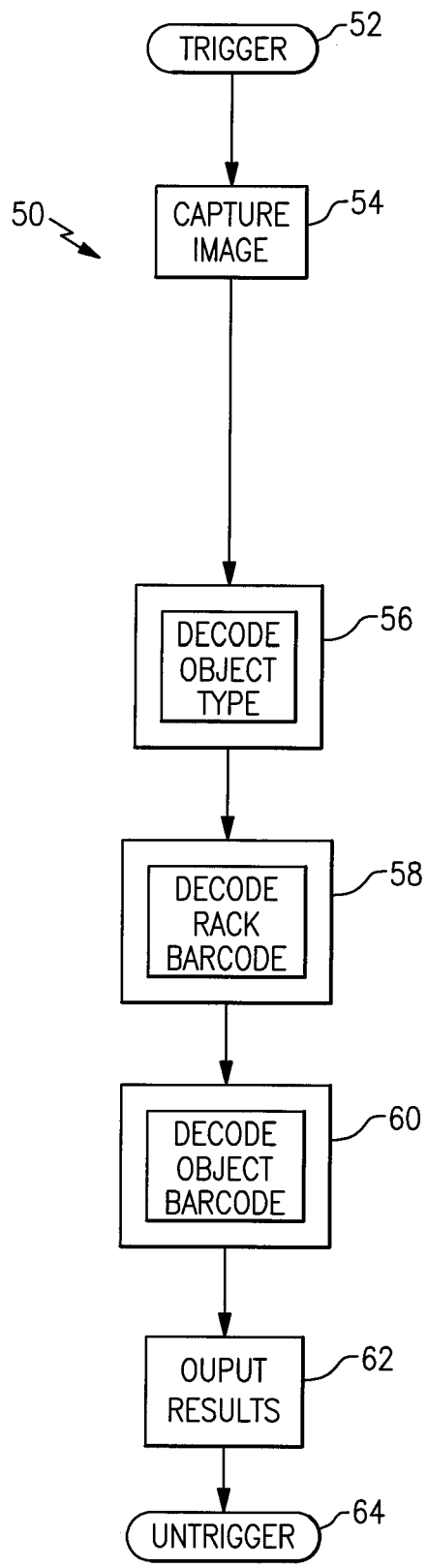
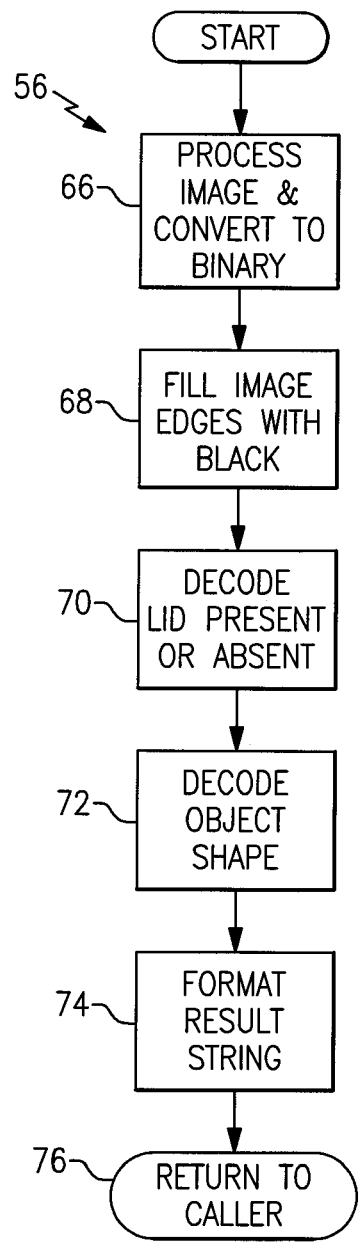
FIG.5
FIG.6

OPTICAL IMAGING SYSTEM AND METHOD USING A REFLECTIVE BACKGROUND

BACKGROUND OF THE INVENTION

1. Field of Invention

The present invention relates to machine vision and, more specifically, to a system and method for improving image processing using a reflective background.

2. Description of Prior Art

Machine vision plays an important role in automated and robotic systems, such as assembly line manufacturing, quality control inspection, and sample processing. Conventional systems are generally comprised of a optical imager, such as a charged coupled device (CCD) or similar device using digital imaging technology, that is positioned capture images of objects that pass in front of it. In low-light or enclosed applications, machine vision systems may include an illumination source, such as a bank of light emitting diodes (LEDs), positioned proximately to the imager. The images are subsequently processed to decode information contained in the resulting two-dimensional image, such as 1D linear codes, 2D stacked/matrix codes, OCR fonts, and postal codes. The image captured by the machine vision system may also be subjected to more advanced processing, such as shape recognition or detection algorithms, that provide information about the object of interest in the image. However, the characteristics of digital images taken by machine vision systems, such as the contrast of the image, often limit the processing techniques that may be employed and adversely affects the accuracy of the results obtained from the processing of the image contents.

Some attempts to improve the quality of images obtained by machine vision systems involve the use of sophisticated lighting systems to improve the digital image captured by the system. For example, the illumination source may comprise multiple banks or arrays of LEDs that completely encircle the targeted object. While such a system is useful for solitary, immobile objects, it is not as effective for illuminating objects in motion and requires a plethora of expensive components.

Other attempts to more completely capture the digital image of an object in a machine vision system include the addition of a second light source or second imager for illuminating the object. For example, a second light source positioned adjacent to the imager and the associated primary light source, or a second light source positioned on the opposite side of the object to be imaged will increase the amount of light reflected by the object, thereby improving the quality of a digital image taken of the object. Imaging systems using sophisticated illumination banks or arrays require additional components that increase the cost of the machine vision system, need additional circuitry for controlling the dual illumination sources or imagers, and require a large footprint in the assembly line or process where they are used.

SUMMARY OF THE INVENTION

It is a principal object and advantage of the present invention to provide a system and method for improving the contrast of an image captured by a machine vision system.

It is an additional object and advantage of the present invention to provide a system and method for reducing the costs associated with machine vision systems.

It is a further object and advantage of the present invention to provide a system and method for reducing the elements required by machine vision systems.

Other objects and advantages of the present invention will in part be obvious, and in part appear hereinafter.

SUMMARY OF THE INVENTION

In accordance with the foregoing objects and advantages, the present invention comprises a system for obtaining an image of an object comprising a optical imager that includes an illumination source positioned on one side of the object to be imaged and a reflective background positioned on the other side of the object. In an alternative embodiment, the present invention comprises at least one imager positioned to capture images of objects moving along an assembly line or process and a reflective background behind the row of samples. The system of the present invention may be implemented where there are significant space restrictions, thereby providing advanced imaging capabilities that were previously unavailable, and may be used replace multiple elements, thereby reducing cost. The imager is programmed to perform decoding of information contained within the image, such as any barcodes or recognizable symbology, as well as for more advanced image processing, such as pattern matching and shape detection.

BRIEF DESCRIPTION OF THE DRAWINGS

The present invention will be more fully understood and appreciated by reading the following Detailed Description in conjunction with the accompanying drawings, in which:

FIG. 5 is a flowchart of a method of using the present invention to perform multiple image processing tasks;

FIG. 6 is a flowchart of a method of using the present invention to perform object type decoding;

DETAILED DESCRIPTION

Figure 1A:
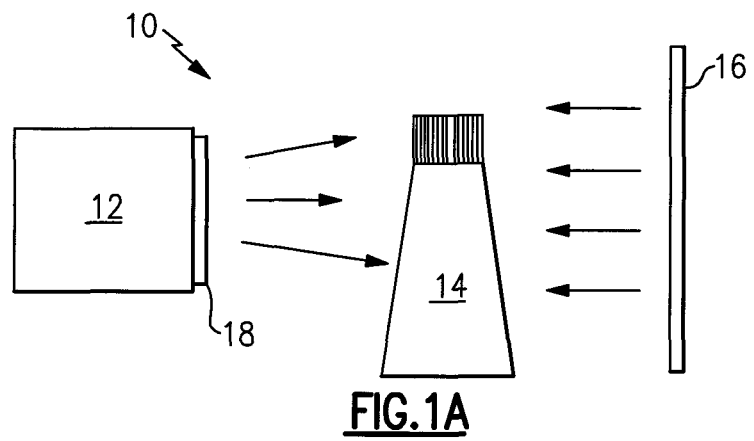
FIG. 1 is a schematic of a system according to the present invention.
Figure 1B:
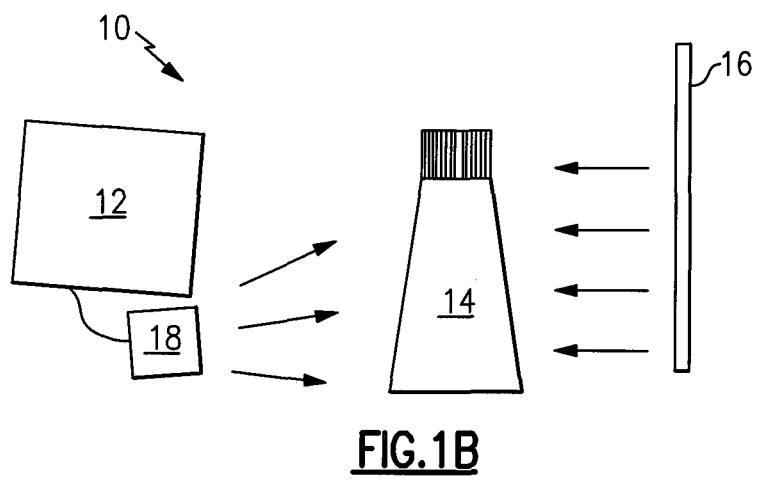

Referring now to the drawings, wherein like numerals refer to like parts throughout, there is seen in FIGS. 1A and 1B, a machine vision system 10 according to the present invention. System 10 comprises an optical imager 12 positioned on one side of a target object 14, and a reflective background 16 positioned on the opposite side of object 14.

Imager 12 preferably comprises a complementary metal oxide semiconductor (CMOS) image sensor and is capable of reading and interpreting two-dimensional images, such as 1D linear codes, 2D stacked/matrix codes, OCR fonts, RSS (Reduced Space Symbology) codes, and postal codes, as well as provides image capturing for use in a wide range of applications, such as image and shape recognition, signature capture, image capture, and optical character recognition (OCR).

As seen in FIG. 1A, imager 12 includes an on-board illumination source 18 comprising one or more light emitting diodes (LEDs) of various wavelengths, to provide illumination of object 14. For example, imager 12 may include red LEDs for general illumination and green LEDs for targeting. As seen in FIG. 1B, illumination source 18 may be separately attached to imager 12 and positioned proximately thereto.

Imager 12 may comprise an IT4×10/80 SR/SF or IT5×10/80 series imager available from Hand Held Products, Inc. of Skaneateles Falls, N.Y. that is capable of scanning and decoding most standard barcodes including linear, stacked linear, matrix, OCR, and postal codes. The IT5×10/80 series imager is a CMOS-based decoded output engines that can read 2D codes, and has image capture capabilities. Imager 12 obtains an optical image of the field of view and, using preprogrammed algorithms, deciphers the context of the image to determine the presence of any decodable barcodes, linear codes, matrix codes, and the like. As will be explained hereinafter, imager 12 may further be programmed to perform other image processing algorithms, such as shape recognition, culling, match filtering, statistical analysis, and other high-level processing techniques, in addition to barcode detection.

Reflective background 16 comprises a thin film or sheet having reflective properties that is aligned to reflect all or a portion of light emitting from illumination source 18 back to imager 12. Reflective background 16 preferably includes retroreflective characteristics. Positioning of reflective material 16 saturates the background, thus improving the contrast of the image taken by imager 12, allowing for the use of advanced processing techniques without the need for additional illumination sources or sophisticated illumination control circuitry. Preferably, reflective background 16 comprises seven millimeter retro-reflective sheeting. Sheeting generally comprises a layer of glossy mylar bonded to a liner by an adhesive, such as a layer of permanent acrylic. The layer of mylar and the layer of adhesive are preferably one millimeter thick each and the liner may comprise 90# polyethylene coated paper, resulting in a reflective sheeting of approximately seven millimeters in thickness. An acceptable reflective sheeting is the Series 680 Reflective Sheeting available from 3M of St. Paul, Minn.

Figure 2:
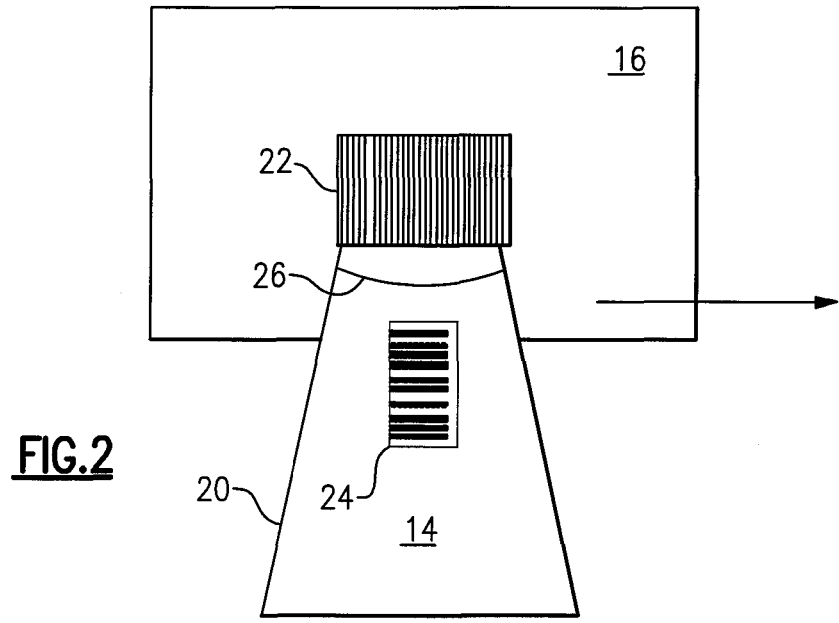
FIG. 2 is a schematic of an image according to the present invention.

Referring to FIG. 2, sample object 14 may comprise a container 20, such as a vial, test tube, flask, pipette, cup, etc. having a lid 22 thereon, and may be imaged by system 10 and decoded to reveal the data included in a barcode 24 placed on container 20 as well as other information present in the image of container 20 itself. Due to the improved contrast obtained from the use of reflective background 16, the image of container 20 may be processed to decode, isolate, or cull object information, such as the presence or absence of lid 22. Due to the improved contrast, the shape of lid 22 or the shape of object 14 itself may be identified through the use of image matching algorithms programmed into imager 12. As a result, system 10 can provide critical information as to the type of container 20, the type of lid 22, and whether container 20 has been properly closed or sealed. System 10 may also be used to determine other image information, such as the level of fluid 26 contained in container 20 or even the cloudiness of the fluid. Thus, the present invention can perform multiple tasks that were previously unavailable, or otherwise had to be performed manually or with additional mechanical components.

Figure 3:
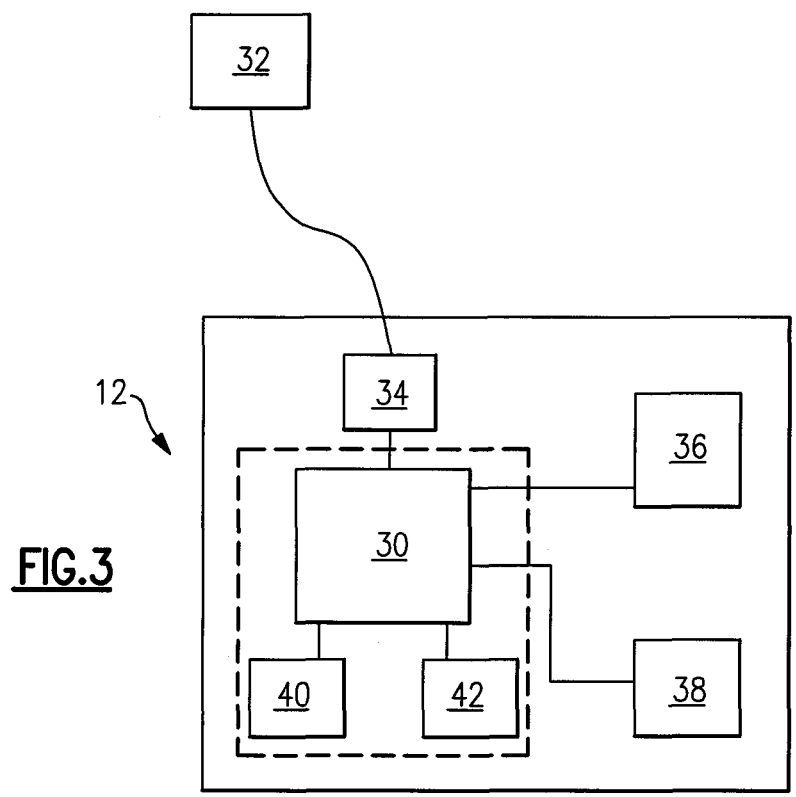
FIG. 3 is a schematic of an alternative embodiment according to the present invention.

Referring to FIG. 3, imager 12 includes a microcontroller 30 for managing imaging and illumination operations, performing processing of captured images, and communicating with a remote device 32, such as a host computer, through a host interface 34. Host interface 34 may comprise a conventional RS232 transceiver and associated 12 pin FFC jack. Alternatively, interface 34 may comprise other conventional buses, such as USB, IEEE, 1394, IrDA, PCMCIA, or Ethernet (TCP/IP). Interface 34 may also comprise a wireless transceiver for wireless communication to a host computer and is programmed with the applicable protocols for interfacing with a host computer, such as Bluetooth(r) or 802.11 protocols.

Microcontroller 30 is electrically connected to an imaging engine 36 for driving the optical imaging of a target object and receiving image data. Microcontroller 30 is also connected to an illumination engine 38 used for controlling timing and illumination source 18. Optionally, imaging engine 36 and illumination engine 38 may be provided in a single unit interconnected to microcontroller 30. Microcontroller 30 may comprise a MC9328MXL VH15 microprocessor, available from Freescale Semiconductor, Inc. of Chandler, Ariz. that is programmed prior to implementation in imager 12, or programmed anytime thereafter, such as by using interface 34 to upgrade the firmware used to control microcontroller 30.

Device 32 controls imaging of objects 14 and reflective background 16 based on host commands received from to host interface 34. Similarly, microcontroller 30 is capable of providing data to host device 32 via interface 34. As will be explained in more detail hereinafter, microcontroller 30 may be programmed to perform legacy barcode interpretation as well as advanced image processing, thereby reducing or eliminating the need for sophisticated or time-consuming communication of data to host device 32. For example, microcontroller 30 may be associated with a barcode interpretation submodule 40 reading and interpreting two-dimensional images, such as 1D linear codes, 2D stacked/matrix codes, OCR fonts, and postal codes. Microcontroller 30 may also be associated with an image processing submodule 42 that is programmed to perform more advanced image analysis techniques, such as pattern matching. Although barcode interpretation submodule 40 and image processing submodule 42 are shown in FIG. 4 as implemented independently from microcontroller 30, it should be obvious to those of skill in the art that barcode interpretation submodule 40 and image processing submodule 42 may be implemented directly on microcontroller 30.

Figure 4:
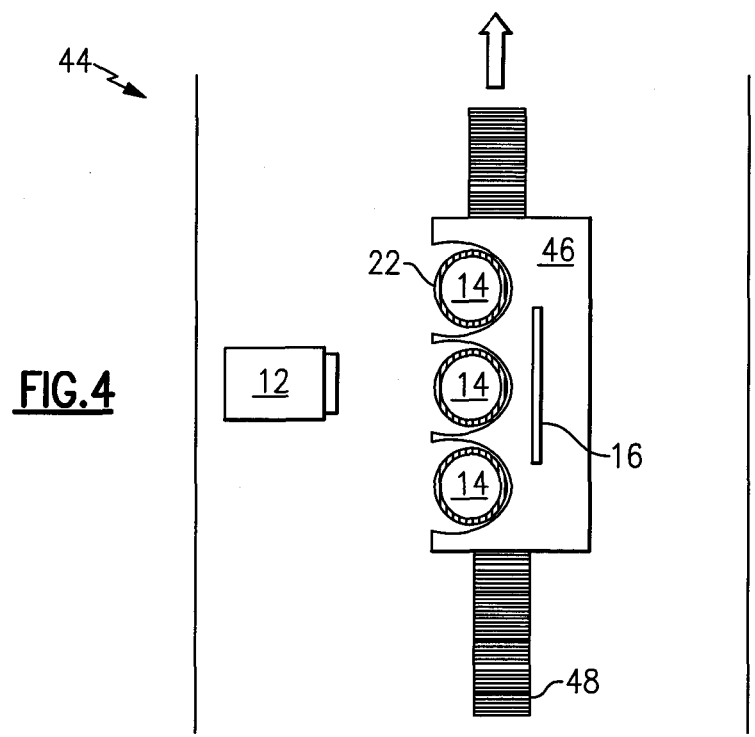
FIG. 4 is a schematic of another embodiment of the present invention.

Referring to FIG. 4, system 10 of the present invention is adaptable for use in a separate device, such as a sample handler 44, for capturing images of and providing information about objects 14 present in handler 44. System 10 may be interconnected to handler 44 through interface 16 via a conventional serial port, such as RS232, or other known communication protocols, such as USB, for receiving host commands from handler 44 and returning data to handler 44. Handler 44 is shown as including a rack 46 capable of holding and conveying three objects 14, although it should be recognized that various arrangements and numbers of objects 14 may be conveyed through handler 44. Handler 44 includes a conveyor 48, such as a magnetic drive system, for moving rack 46 longitudinally along a predetermined direction. Imager 12 is positioned on one side of rack 46 and directed to illuminate and capture images of objects 14 and rack 46. After imaging and processing of one object 14 is complete, conveyor 48 moves rack 46 so that an adjacent object 14 (or one on a subsequent rack 46) is positioned in front of imager 12 for image capture. Reflective background 16 is suspended in a fixed positioned above rack 46 and behind objects 14 as they pass in front of imager 12. Reflective background 16 is aligned to reflect illumination from imager 12 onto the rear side of object 14, thereby providing improved image contrast in the image captured by imager 12. Rack 46 may optionally include its own barcode or other symbology applied thereto that may be imaged and decoded by imager 12 without the benefit of reflective background 46.

For optimum performance, object 14 should be properly oriented and centered relative to the images taken by imager 12. Calibration, which may or may not be performed, is accomplished prior to imaging by determining the pixel location of the image start region, the width of the image region, and the offset dimension of the target area relative to the image region (i.e., the location of the object). These values are stored in imager 12 in Flash memory for subsequent use. The difference value, the pixel location of the image start location, and the width of the retro-reflective region provide information to the host for proper horizontal and vertical alignment of imager 12. In addition, there is a known pixel location of the retro-reflective start line that must be adjusted. Hander 44 queries imager 12 for the difference values, which will enable rack 46 to be moved to the correct horizontal position.

Calibration may be accomplished by defining a set of host commands for use by handler 44, such as commands that select the processing mode (such as the direct facing positioning seen in FIG. 4), initiate the calibration process and commits the calibration values to non-volatile memory, initiate the calibration process without committing the calibration values to non-volatile memory, retrieve the width of the image region, and retrieve the pixel location of the image start location. For example, a variable string in the command can indicate standard bar code reading or advanced image processing, such as shape detection and matching. The calibration command is sent after rack 46 is positioned to enable reading of a centrally positioned object 14, and includes a variable indicating whether calibration data will be stored locally. The width command causes imager 12 to return the width of the imaged region to the host. When using two of the preferred imagers described above, a properly calibrated system requires a value between 150 and 230, which is reflective of the width of the retro-reflective region. The start location command returns the pixel location of the image beginning and helps determine if the angle of imager 12 is correct. Imager 12 must be aligned to ensure that this setting has a value in the particular pixel ranges otherwise object 14 may not be in the field of view.

Handler 44 may further benefit from the designation of control commands governing operation of imager 12. For example, predefined commands that trigger imager 12 define what image analysis will be performed (i.e., barcode and/or image analysis) are useful. Commands controlling the amount of time system 10 will attempt to process images and the time period for timeouts may also be defined. Finally, commands governing image processing and selecting the data to be provided to handler 44 by imager 12 may be defined, such as the identification of rack 46, object 14, object type, the presence of a lid 22, the style of lid 22, and the type of compression (if any) to be used when transmitting information regarding the images (or the images themselves), to handler 44.

The general process 50 used by system 10 when configured to perform multiple image processing steps in connection with a host device, such as handler 44, is seen in FIG. 5. After triggering 52, an image of a properly positioned object 14 in rack 46 is captured 54. The object type may then decoded 56 from the image. Any barcode on rack 46 may then be decoded 58 and the barcode on object 14 is decoded 60. Finally, the results are output 62 to handler 44, and imager 12 is untriggered 64.

As seen in FIG. 6, object type decoding 56 is accomplished by processing the image and converting to binary 66. The image edges are then filled in with black 68 to enhance decoding efforts. The image is then decoded 70 to determine presence of absence of a lid 22, such as a test tube cap, and to determine the particular shape 72, such as the style of test tube. The result string is then formatted 74 for transmittal to the host device, such as handler 44, and control is returned 76 to general process 50.

Figure 7:
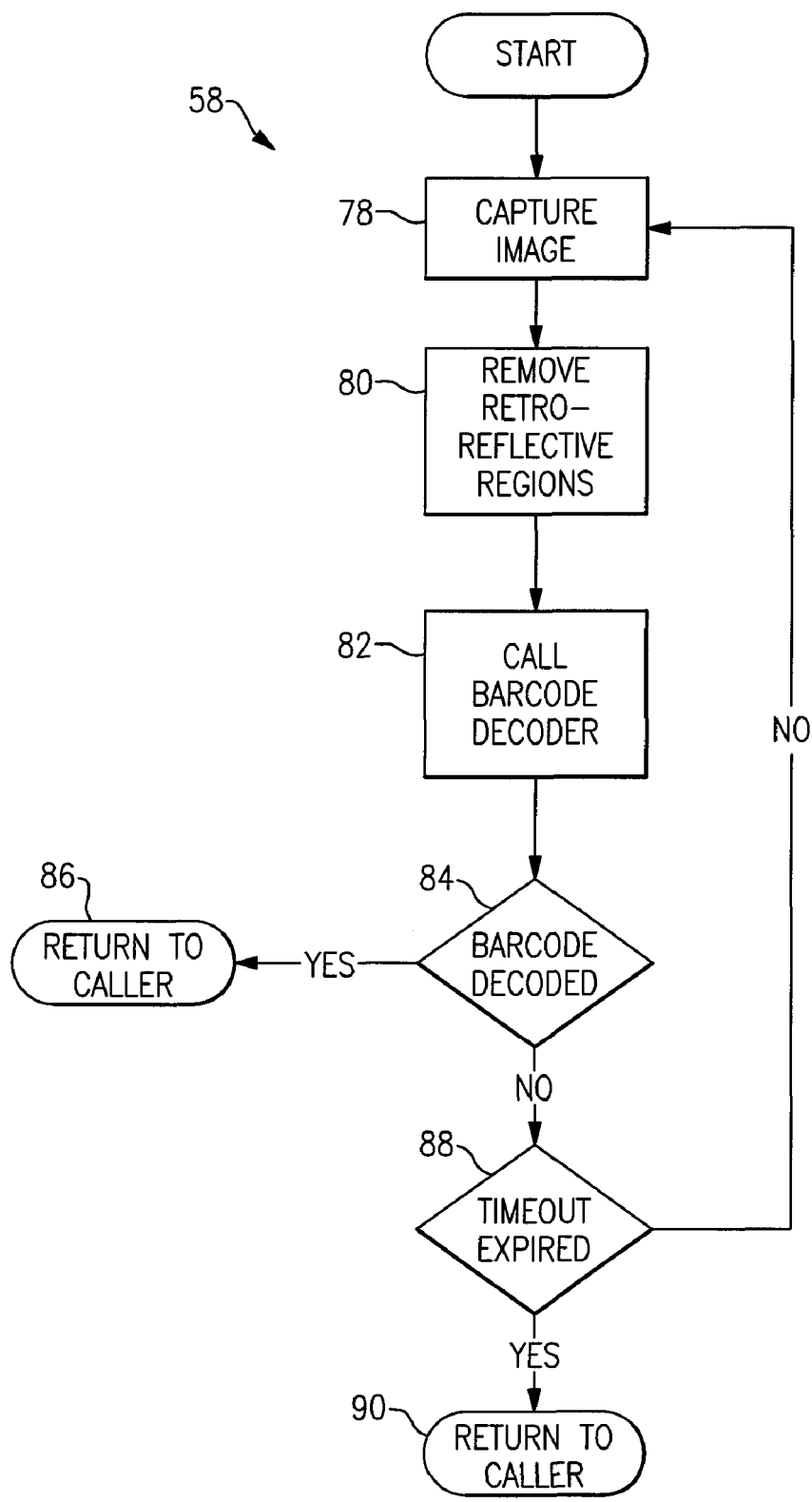
FIG. 7 is a flowchart of a method of using the present invention to decode a barcode on a sample handler rack.

As seen in FIG. 7, decoding of rack barcode 58 comprises the steps of capturing an image 78 of the appropriate location of rack 46 (which is positioned by conveyor 48 in front of imager 12). Any retro-reflective regions (i.e., regions enhanced by the use of reflective background 16) appearing in the image are removed 80 by filling the retro-reflective regions with black. The barcode decoder is then called 82, and a check is performed 84 to determine whether a barcode has been decoded. If so, control is returned 86 to general process 50. If no bar code is determined at step 84, a check is performed to see whether a predetermined timeout period has expired 88. If a timeout period has expired at step 88, control is returned 90 to general process 50. If a timeout has not expired at step 88, control returns to step 78 for another attempt at decoding the rack barcode in a newly captured image.

Figure 8:
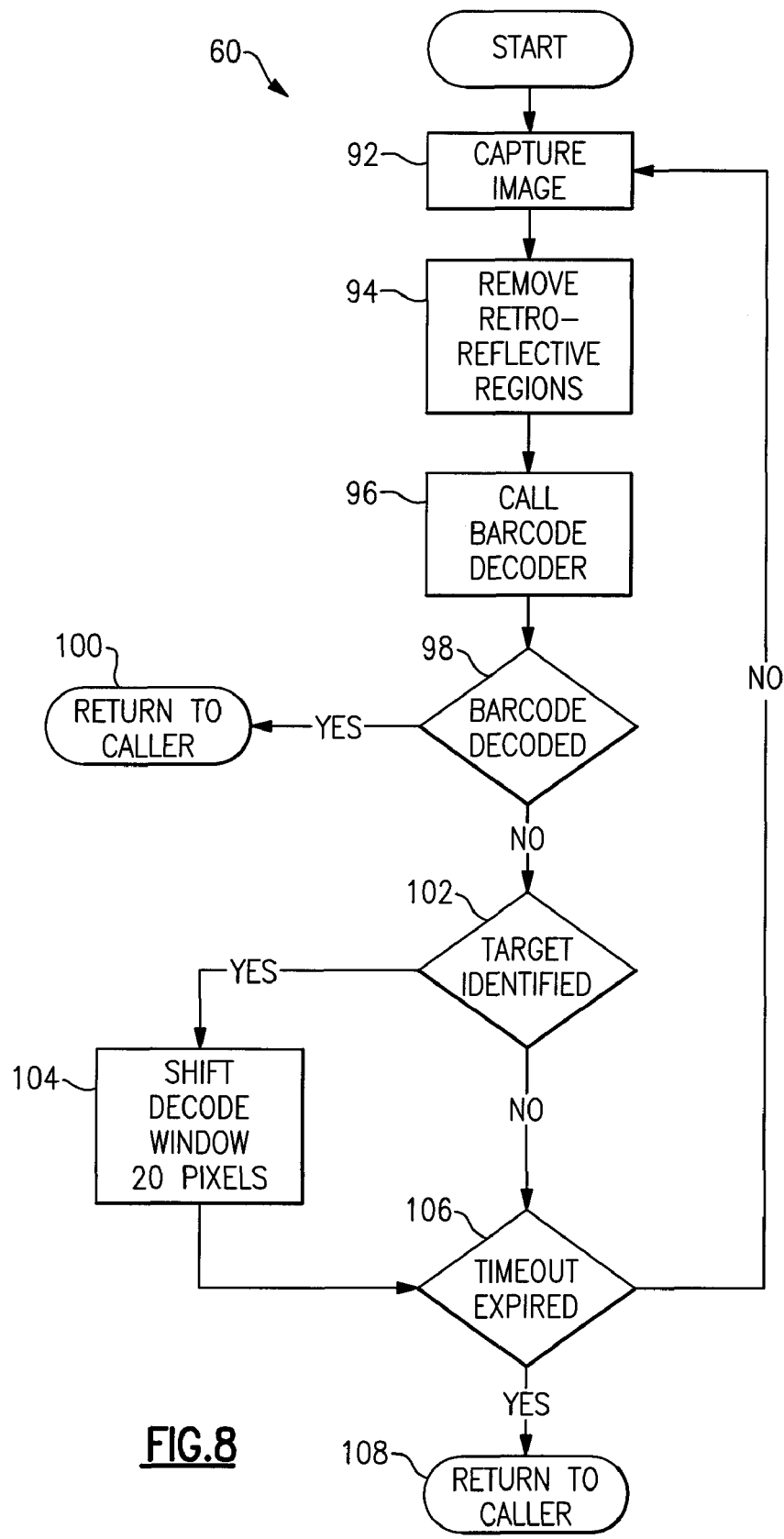
FIG. 8 is a flowchart of a method of using the present invention to decode a barcode on a sample handler test tube.

As seen in FIG. 8, decoding of object barcode 60 comprises the steps of capturing an image 92, removing retro-reflective regions 94, and calling the barcode decoder 96. If a barcode is decoded 98, control is passed 100 back to general process 50. If not, a check is performed 102 to see whether a target shape may be identified and, if so, the decode window is shifted twenty pixels 104 and a timeout is checked 106. If a target shape is not identified at step 102, the timeout is checked 106. If the timeout has not expired at step 106, control returns for another attempt at image capture 92. If the timeout has expired at step 106, control returns 108 to general process 50.

Figure 9:
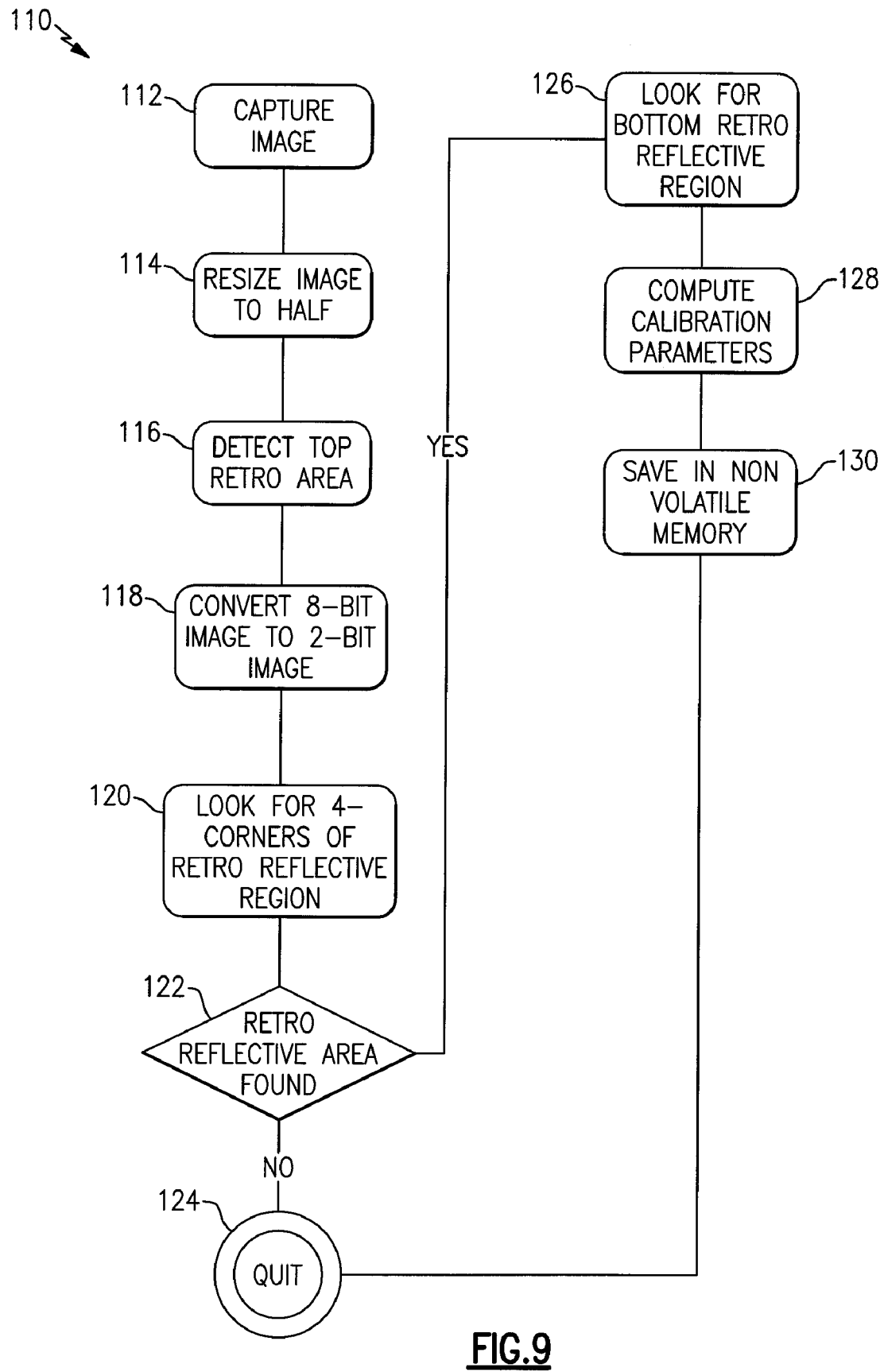
FIG. 9 is a flowchart of a method of calibrating the present invention for the detection of objects.

FIG. 9 depicts the shape detection calibration process 110 for calibrating imager 12 for the detection of the shape of objects 14 appearing in the retroreflective illumination region created by reflective background 16 and captured by imager 12. As explained above, shape detection calibration process 110 may be programmed into microcontroller 30 or in image processing submodule 42. After an image of a shape to be detected is captured 112, the image size is reduced by one-half 114. This data reduction is used to cull the image to improve performance of processing. After image reduction 114, threshold detection is used to detect the top of the retro-reflection portion of the image 116, i.e., the portion of the image that is saturated is identified. The image, which is preferably 8-bit, is reduced to 2-bit 118. The corners of the retroreflective region are then identified 120 by using basic logic and geometry checks to identify the location of the corners of reflective background 16 that are within the image. If the retroreflective region is not found 122, processing ends 124. If the retroreflective region is found at step 122, the bottom of the retroreflective region is located 128 and the calibration parameters (the boundaries of the retroreflective region) are computed 128. These parameters are then saved in non-volatile memory 130 and processing ends 124.

Figure 10:
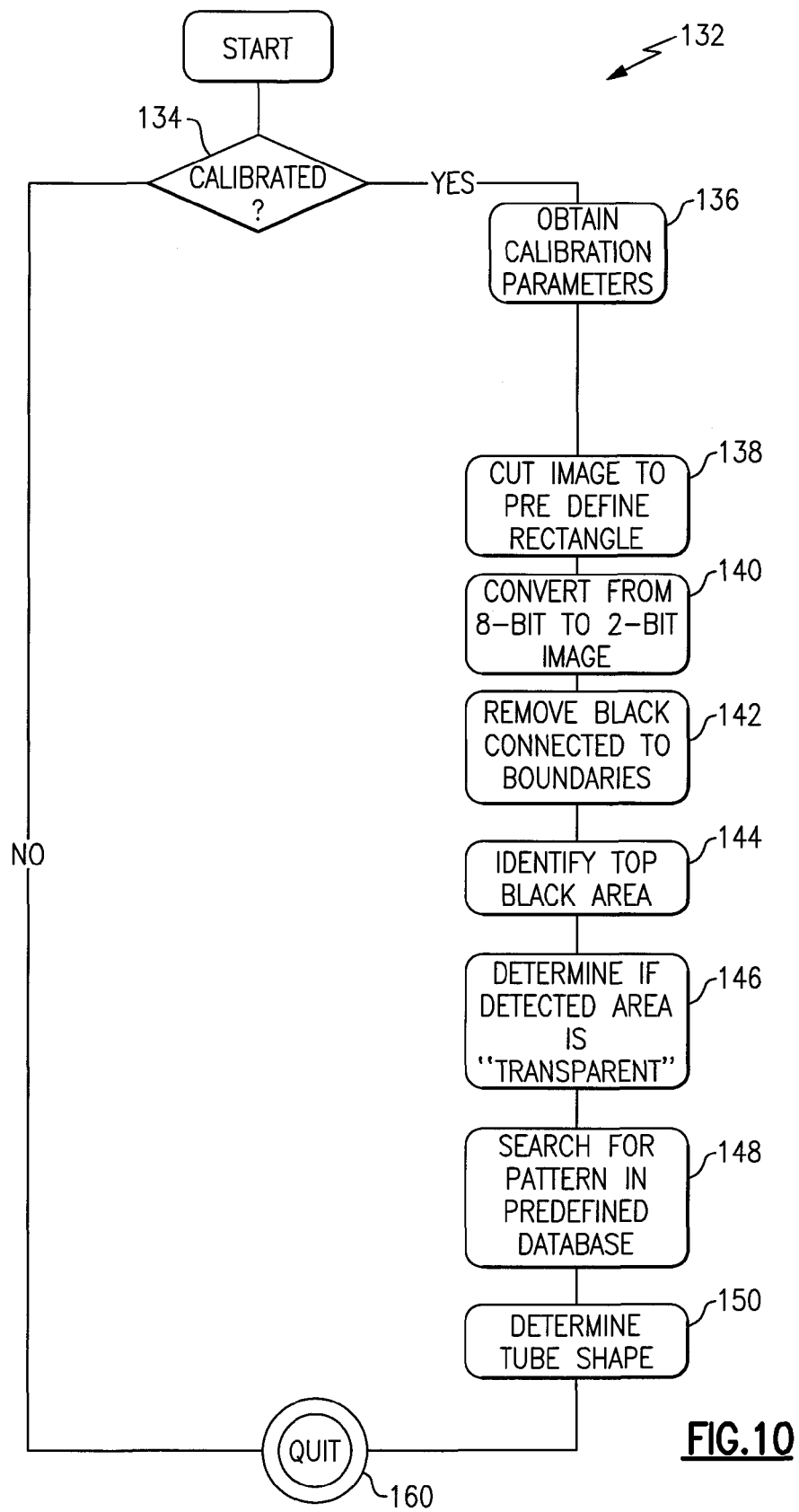
FIG. 10 is a flowchart of a method of using the present invention to perform object shape detection.

FIG. 10 depicts the object shape detection process 132. As explained above, shape detection calibration process 132 may be programmed into microcontroller 30 or in image processing submodule 42. Process 132 begins by checking to determine whether calibration has previously occurred 134. If so, the calibration parameters are called 136 and the image is cropped to isolate the predefined rectangle 138 where further image processing will occur. Next, the image is converted from 8-bit to 2-bit 140 and any black connected to the rectangle boundaries is removed 142. The top black area is identified 144 and the detected area is examined to determine whether it is transparent 146. The image is then pattern matched against patterns stored in a predefined database 148, i.e., through calibration process 110 of FIG. 9. If a pattern is matched, the object shape is determined 150 and processing ends 160.

Using the forgoing calibration and processing techniques, as well as other known processing procedures, the high degree of contrast achieved by system 10 may be used to determine the shape of an object, to detect whether an object is properly configured (e.g., whether lid 22 is positioned on container 20), to determine whether a transparent object has a certain level of fluid (e.g., whether container 20 has a particular fluid level 26), to measure the clarity of fluid in a transparent object, to detect clumps or bubbles in a fluid, or to detect shapes on an object (such as a trademark or logo)

What is claimed is:

1. A system for capturing an image of an object, comprising:
    an optical imager positioned on one side of said object and configured to capture a digital image of the object along a first axis;
    an illumination source associated with said imager and aligned to direct incoherent illumination along a second axis that is not parallel to said first axis directly onto said one side of said object;
    a retroreflective surface positioned on the opposing side of and spaced apart from said object for reflecting light emitted from said illumination source onto at least a portion of the opposing side of said object and saturating the background of said object in said digital image; and
    a microcontroller interconnected to said imager that is programmed to generate a modified digital image by replacing the saturated background in said digital image with black pixel values and then interpreting said modified digital image to decode any information encoded therein.

2. The system of claim 1, wherein said imager and said illumination source are integrally attached to each other.

3. The system of claim 1, wherein said imager and said illumination source are positioned separately and apart from each other.

4. The system of claim 2, wherein said illumination source comprises an array of light emitting diodes.

5. The system of claim 1, wherein said retroreflective background comprises a layer of mylar.

6. The system of claim 5, wherein said imager is programmed to identify said object.

7. The system of claim 6, wherein said imager identifies said object by searching for a pattern in said modified digital image and compares said pattern to at least one reference pattern.

8. A system for processing a plurality of objects moving in a predetermined direction, comprising:
    an optical imager positioned along a first axis to capture digital images of one side of said objects;
    an illumination source associated with said imager to direct incoherent illumination along a second axis that is not parallel to said first axis directly onto said one side of said objects;
    a retroreflective surface positioned on the other side of and spaced apart from said objects to reflect light onto at least a portion of the other side of said objects and saturate the background of said objects in said digital images; and
    a microcontroller interconnected to said imager that is programmed to generate modified digital images by replacing the saturated background in said digital images with black pixel values and then interpreting said modified digital images to decode any information encoded therein.

9. A method of capturing an image of an object, comprising the steps of:
    directing incoherent illumination along a first axis from an illumination source directly at a first side of said object;
    reflecting said illumination onto at least a portion of the opposite side of said object using a retroreflective material spaced apart from said object;
    capturing a digital image of said first side of said object using an optical imager aligned along a second axis that not parallel to said first axis while said illumination is being reflected onto at least a portion of the opposite side of said object such that the background of said object is saturated in said digital image;
    generating a modified digital image by replacing the saturated background in said digital image with black pixel values and then interpreting said modified digital image to decode any information encoded therein.

10. The method of claim 9, further comprising the step of decoding barcode information contained within said modified digital image.

11. The method of claim 10, further comprising the step of identifying said object.

12. The method of claim 11, wherein the step of identifying said object comprises the steps of:
    searching for a pattern in said modified digital image; and
    comparing said pattern in said modified digital image with at least one reference pattern.

13. The method of claim 12, wherein said at least one reference pattern is stored in a database in said imager.

14. A system for handling objects, comprising
    a rack for retaining at least one object;
    a conveyor for moving said rack in a predetermined direction;
    an optical imager positioned along a first axis to capture a digital image of a first side of said object;
    an illumination source associated with said imager and positioned along a second axis that is not parallel to said first axis for emitting incoherent light directly at said first side of said object;
    a retroreflective surface spaced apart from said object and positioned to reflect said emitted light onto a second side of said object and saturate the background of said object in said digital image; and
    a microcontroller interconnected to said imager that is programmed to generate a modified digital image by replacing the saturated background in said digital image with black pixel values and then interpreting said modified digital image to decode any information encoded therein.

15. The system of claim 14, wherein said imager and said illumination source are integral.

16. The system of claim 14, wherein said imager and said illumination source are spaced separately and apart from each other.

17. The system of claim 14, wherein said imager is programmed to decode barcode information contained within said modified digital image.

18. The system of claim 17, wherein said imager is programmed to identify said at least one object.

* * * * *